United States Patent
Hong

(10) Patent No.: US 7,315,359 B2
(45) Date of Patent: Jan. 1, 2008

(54) METHOD FOR MONITORING MICRO-LENS CURVATURE IN-LINE

(75) Inventor: Chang Young Hong, Choongcheongbukdo (KR)

(73) Assignee: Dongbu Electronics Co., Ltd., Seoul (KR)

( * ) Notice: Subject to any disclaimer, the term of this patent is extended or adjusted under 35 U.S.C. 154(b) by 41 days.

(21) Appl. No.: 11/216,270

(22) Filed: Aug. 30, 2005

(65) Prior Publication Data
US 2006/0146316 A1  Jul. 6, 2006

(30) Foreign Application Priority Data
Dec. 30, 2004  (KR) .................. 10-2004-0116518

(51) Int. Cl.
*G01B 9/00*  (2006.01)
(52) U.S. Cl. .................. 356/124; 359/642; 359/648
(58) Field of Classification Search ............... 356/124, 356/642, 648, 609, 612–613
See application file for complete search history.

(56) References Cited

U.S. PATENT DOCUMENTS

| 4,439,025 A | * | 3/1984 | Smirmaul ................ 351/212 |
| 6,762,846 B1 | * | 7/2004 | Poris ...................... 356/609 |
| 2005/0046956 A1 | * | 3/2005 | Gruhlke .................. 359/642 |
| 2007/0002334 A1 | * | 1/2007 | Altman et al. ............. 356/601 |

* cited by examiner

*Primary Examiner*—Tarifur Chowdhury
*Assistant Examiner*—Tara S Pajoohi
(74) *Attorney, Agent, or Firm*—Andrew D. Fortney

(57) ABSTRACT

A method and system for monitoring a curvature of a micro-lens in-line is disclosed. According to embodiments, sizes of circles (or circle images) from a top view of a micro-lens are measured and correlated to a change in focus depth of an optical scope. A method in accordance with embodiments can include the steps of: (i) measuring a diameter or area of a circle in the micro-lens when focusing a scope on a top point of the micro-lens; (ii) measuring a diameter or area of one or more second circles in the micro-lens by focusing the scope on one or more points lower than the top point of the micro-lens in stages, each stage correlated to changing a depth of focus of the scope; and (iii) calculating the curvature of the micro-lens with each diameter or area of the measured circles.

19 Claims, 8 Drawing Sheets

METHOD FOR MONITORING MICRO-LENS CURVATURE IN-LINE

CROSS-REFERENCE TO RELATED APPLICATIONS

This application claims the benefit of Korean Application No. P2004-116518, filed on Dec. 30, 2004, which is hereby incorporated by reference in its entirety.

BACKGROUND OF THE INVENTION

1. Field of the Invention

The present invention generally relates to a method for monitoring a curvature of a micro-lens in-line and, more particularly, to a method for monitoring a curvature of a micro-lens in-line during a production flow, in which a size of a circle image on a top view of the micro-lens is measured according to a change in a focus on an optic scope.

2. Discussion of the Background

Generally, a complementary metal oxide semiconductor (CMOS) image sensor can include a photo-sensing unit and a logic circuit unit. The photo-sensing unit may receive the light and the logic circuit unit may convert the light to electric signals. In order to improve photosensitivity, an occupying area of the photo-sensing unit in an entire CMOS image sensor may be increased. However, since the entire area of the CMOS image sensor is fixed, this method for increasing the occupying area of the photo-sensing unit has associated limits. Accordingly, light may be condensed to the photo-sensing unit by changing the path of light incident extending beyond the photo-sensing unit. For this, a micro-lens can be provided that corresponds to the photo-sensing unit on a color filter array.

Referring now to FIG. 1, a cross sectional view illustrating a conventional CMOS image sensor is shown. In a process for fabricating a micro-lens of a CMOS image sensor according to the conventional approach of FIG. 1, a photo-sensing unit (not shown, for example, a photodiode) and a logic circuit unit (not shown, for example, a plurality of transistors) may be formed in each cell region on substrate 101.

Then, a color filter array layer 102 may be formed in each cell region of the substrate 101 having the photo-sensing unit and the logic circuit unit. In color filter array layer 102, each color filter layer of red, green and blue may be provided corresponding to each photo-sensing unit, for example. Next, planarization layer 103 may be formed on color filter array layer 102. Further, micro-lens 104 may be formed on planarization layer 103 corresponding to each photo-sensing unit.

According to the above process steps, a conventional CMOS image sensor may be fabricated. In these conventional fabrication process steps, the last process steps for fabricating color filter array layer 102 and micro-lens 104 may be directly related to the color characteristics of the CMOS image sensor. In particular, a curvature of each micro-lens may be a very important factor in the CMOS image sensor operation. However, in many fabrication process lines, it is difficult to monitor the curvature of the micro-lens. Accordingly, many such fabrication lines are typically controlled by measuring a space and not a curvature of a sample micro-lens.

Referring now to FIG. 2, an illustration of a photograph of measuring the space between micro-lenses by a conventional CD-SEM approach is shown. As described above, on such a fabrication process line, it may be very difficult or not feasible to measure the curvature of the micro-lens. In the conventional approach indicated in FIG. 2, in the fabrication process line, the space between micro-lenses may be measured by CD-SEM, thereby allowing control of the fabrication process.

Further, since it may be difficult or impractical to measure the curvature of a micro-lens on a fabrication process line, the curvature of the micro-lens may instead be determined by using a cross-sectional SEM image. In such an approach, the substrate of a completed CMOS image sensor is generally destroyed in order to make the appropriate measurements after completion of the micro-lens fabrication process.

Referring now to FIG. 3, an illustration of a conventional process for monitoring a curvature of a micro-lens by rejecting a produced substrate is shown. In the approach indicated in FIG. 3, in order to measure the curvature of a sample micro-lens, a produced substrate are typically rejected or destroyed in order to provide samples at fixed periods in the manufacturing process flow. Each such sample can then be used to obtain a cross-sectional SEM for measuring purposes. From the cross-sectional SEM, a horizontal length and a vertical height of the sample micro-lens may be measured to calculate the curvature of the micro-lens.

However, as discussed above, methods for fabricating a CMOS image sensor according to conventional approaches has several disadvantages. First, it may be difficult or impractical to monitor the curvature of a micro-lens, which is very important factor in CMOS image sensors. Accordingly, it is difficult to determine whether a process for manufacturing the micro-lens has any problems or is producing micro-lenses outside of design specifications.

Also, in order to monitor a curvature of a micro-lens in other conventional approaches, produced substrates may be rejected or destroyed at fixed periods in a fabricating process in order to obtain representative cross-sectional SEMs. In this approach, rejected substrates cannot be re-used, so there is typically a corresponding yield and/or productivity loss as a result.

SUMMARY OF THE INVENTION

Embodiments of the present invention relate to systems and methods for monitoring a curvature of a micro-lens in-line that substantially obviate one or more problems due to limitations and disadvantages of the related art and that do not rely on destroying or rejecting wafers for such monitoring.

In accordance with embodiments, a method for monitoring a curvature of a micro-lens in-line includes measuring a size of a circle image on a top view of the micro-lens correlated to a change in a focus on an optic scope.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure particularly pointed out in the written description and claims hereof as well as the appended drawings.

In accordance with embodiments of the present invention, a method for monitoring a curvature of a micro-lens in-line can include the steps of: (i) measuring a diameter of a first circle in the micro-lens by focusing a scope on a top point of the micro-lens; (ii) measuring a diameter of a second circle in the micro-lens by focusing the scope on a point lower than the top point of the micro-lens, correlated to a focus depth of the scope; and (iii) calculating the curvature of the micro-lens using each diameter of the measured circles.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to preferred embodiments of the present invention, examples of which are illustrated in the accompanying drawings. Wherever possible, the same reference numbers will be used throughout the drawings to refer to the same or like parts.

Hereinafter, a method for in-line monitoring of micro-lens curvature according to the present invention will be described with reference to the accompanying drawings.

In a method for monitoring a curvature of a micro-lens in-line according to embodiments of the present invention, as a focus depth of a scope on or in a micro-lens changes, a shape and/or size of the micro-lens may change, as seen from a top view image of the lens. During this process, one circle may be shown, and this circle may present a contrast from other associated circles. In a method according to embodiments of the present invention, the curvature of the sample micro-lens can be calculated by measuring a diameter of the circle.

Figure 4:
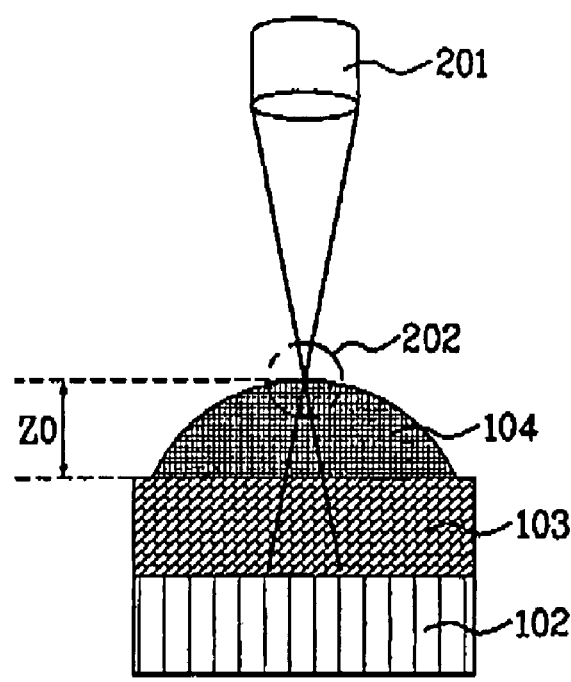
FIG. 4 illustrates an image when a scope is focused on a top point of micro-lens according to embodiments of the present invention.

Referring now to FIG. 4, an issustration of an image when a scope is focused on a top point of a micro-lens according to embodiments of the present invention is shown. Planarization layer 103 (e.g., comprising a photoresist) may be deposited on color filter array 102 and micro-lens 104 may be deposited on planarization layer 103. The process of forming lower portions (not shown) below color filter array 102 may include the same or similar steps as those approaches conventionally usid in the art.

When a focus 202 of scope 201 is placed on a top point of micro-lens 104, a height 'Z0' from the bottom of micro-lens 104 to focus point 202 can be measured. This measurement generally corresponds to a height of the micro-lens 104. Focus 202 may be positioned substantially in the center of the top of micro-lens 104 for determination of the curvature of the micro-lens 104.

Figure 5:
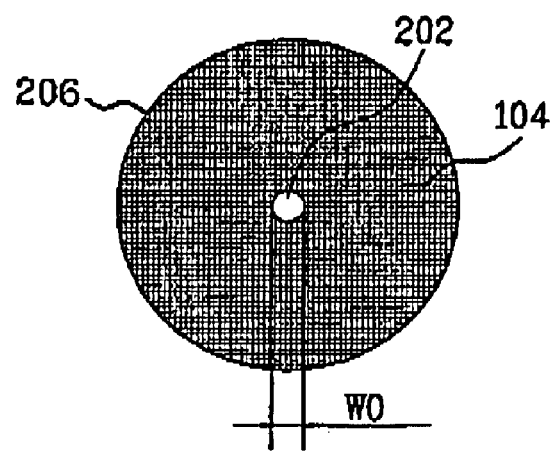
FIG. 5 is a top view illustrating an image when a scope is focused on a top point of micro-lens according to embodiments of the present invention.

Referring now to FIG. 5, a top view illustrating an image when the scope is focused on the top point of micro-lens according to embodiments of the present invention is shown. Outer large circle 206 may correspond to the bulk micro-lens 104 (e.g., that portion shown in FIG. 4 below focus point 202), and inner small circle 202 may correspond to the circumference of the inicrolens at the focus point 202 shown in FIG. 4. When focus 202 is placed substantially on a top point of micro-lens 104, from a top view, inner small circle 202 is shown by a difference of contrast from outer large circle 104. At this time, inner small circle 202 has a diameter of 'W0', as shown.

Figure 6:
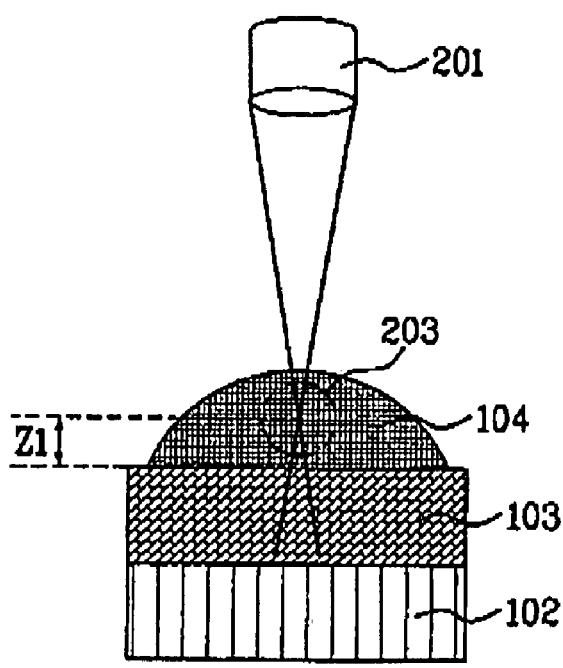
FIG. 6 illustrates an image when a scope is focused on a central point of micro-lens according to embodiments of the present invention.

Referring now to FIG. 6, an illustration of an image when a scope is focused on a central point of a micro-lens according to embodiments of the present invention is shown. When focus 203 of scope 201 is substantially at or on a central point of micro-lens 104, a height from the bottom of micro-lens 104 to focus point 203 can be measured as 'Z1'. Accordingly, a position of focus 203 is generally lower than the position of focus point 202 shown in FIG. 4.

Figure 7:
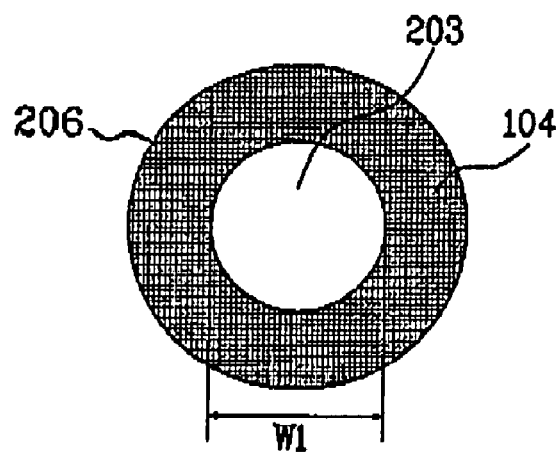
FIG. 7 is a top view illustrating an image when a scope is focused on a central point of a micro-lens according to embodiments of the present invention.

Referring now to FIG. 7, a top view illustrating an image when the scope is focused on a central point of a micro-lens according to embodiments of the present invention is shown. Outer large circle 206 may correspond to the bulk micro-lens 104 (e.g., that portion shown in FIG. 6 below focus point 203), and inner small circle 203 may correspond to the circumference of the microlens at the focus point 203 shown in FIG. 6. When focus 203 of micro-lens 104 is substantially on or at a central point of micro-lens 104, from a top view, small circle 203 is seen by a difference of contrast. At this time, inner small circle 203 has a diameter of 'W1'. which is generally larger than the diameter of circle 202 shown in FIG. 5.

Figure 8:
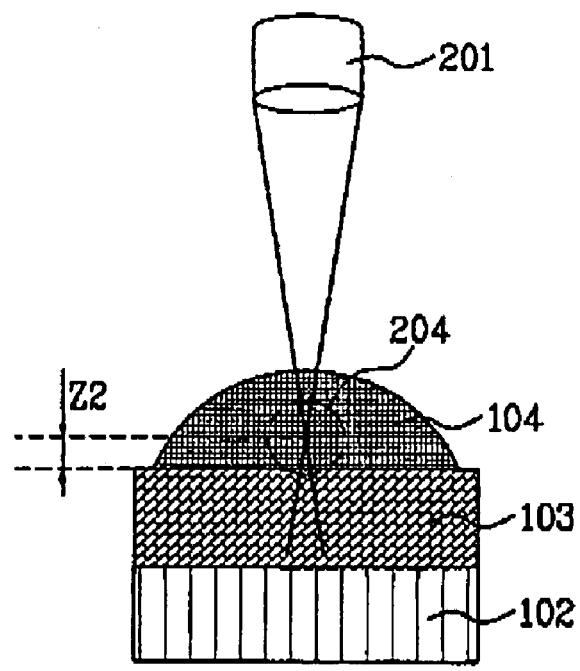
FIG. 8 illustrates an image when a scope is focused on a lower portion of micro-lens according to embodiments of the present invention.

Referring now to FIG. 8, an illustration of an image when a scope is focused on a lower portion of a micro-lens according to embodiments of the present invention is shown. When focus 204 of scope 201 is on or at a lower portion of micro-lens 104, a height from the bottom of micro-lens 104 to focus point 204 can be measured as 'Z2'. The position of focus point 204 is generally lower than the position of focus point 203 shown in FIG. 6.

Figure 9:
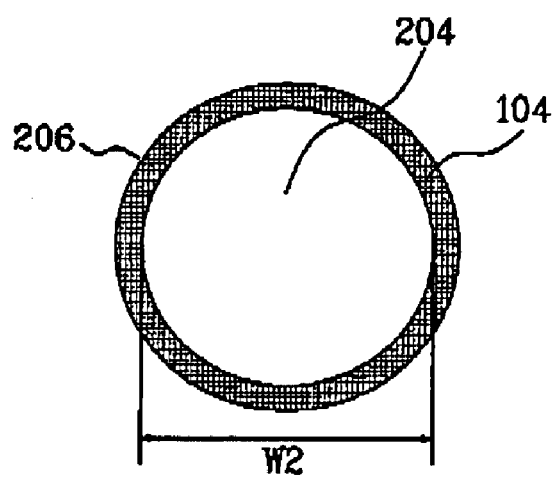
FIG. 9 is a top view illustrating an image when a scope is focused on a lower portion of a micro-lens according to embodiments of the present invention.

Referring now to FIG. 9, a top view illustrating an image when the scope is focused on a lower portion of a micro-lens according to embodiments of the present invention is shown. Outer large circle 206 may correspond substantially to the base of micro-lens 104 shown in FIG. 8, and inner small circle 204 may correspond to the circumference of the microlens at the focus point 204 shown in FIG. 8. When focus 204 is on the lower portion of micro-lens 104, as seen from a top view, small circle 204 is shown by a contrast difference. At this time, small circle 204 may have a diameter of 'W2', which is generally larger than the diameter of circle 203 shown in FIG. 7.

Figure 10:
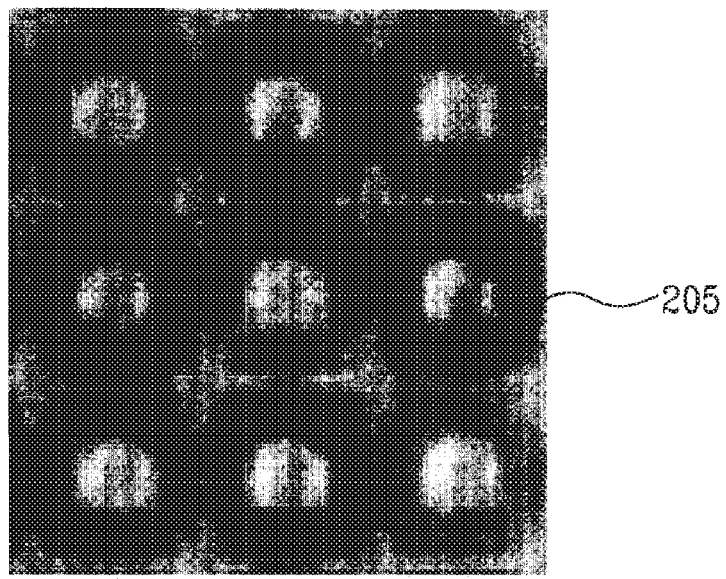
FIG. 10 illustrates an image when a scope is focused on an upper portion of micro-lens on a substantial substrate according to embodiments of the present invention.

Referring now to FIG. 10, an illustration of an image when a scope is focused on an upper portion of a micro-lens on a conventional CMOS image sensor substrate according to embodiments of the present invention is shown. Circle 205 is shown by a contrast difference, as discussed above. Further, when the focus of the scope is changed along or within a range of thickness of the micro-lens (see, for example, FIG. 4, FIG. 6 and FIG. 8), a contrast difference may be generated correlating to the shape of the micro-lens. Accordingly, if the contrast difference is mapped to a three-dimensional image, it is possible to calculate the curvature of the micro-lens.

Figure 11:
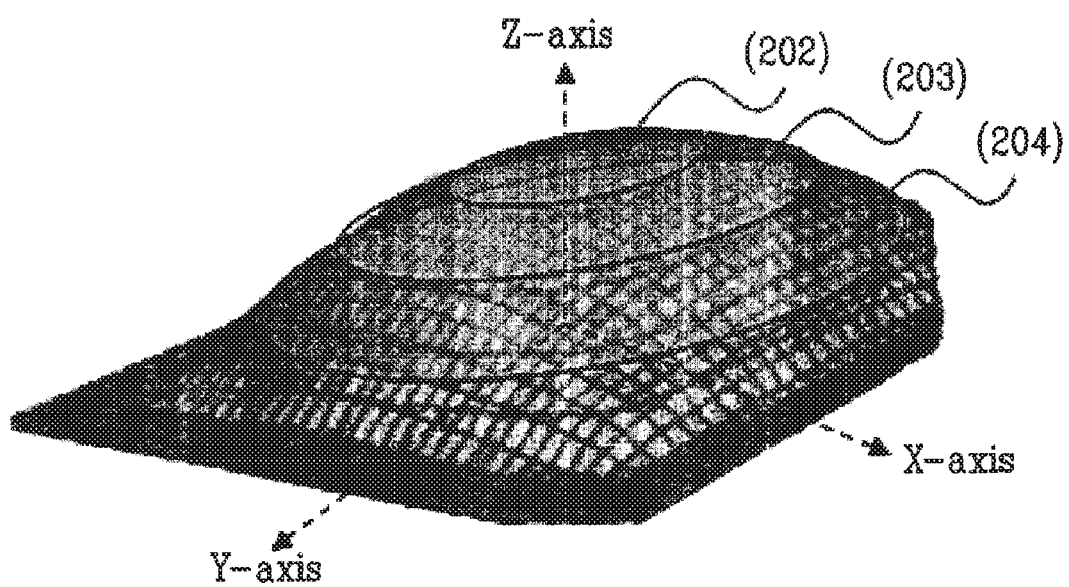
FIG. 11 illustrates an image of the three-dimensional micro-lens of FIG. 4 through FIG. 9.

Referring now to FIG. 11, an illustration of an image of three-dimensional micro-lens corresponding to FIG. 4 through FIG. 9 is shown. For three-dimensional space including the X-axis, the Y-axis and the Z-axis, the three circles 202, 203 and 204 having different diameters from one another are shown. As shown in FIG. 11, circle 202 of FIG. 4 has the smallest diameter and the largest coordinate in the Z-axis, circle 203 of FIG. 6 has an intermediate diameter and corresponding intermediate coordinate in the Z-axis, and circle 204 of FIG. 8 has the largest diameter and the smallest coordinate in the Z-axis.

That is, circle 202 of FIG. 4 has the smallest coordinates in the X-axis and the Y-axis, circle 203 of FIG. 6 has intermediate coordinates in the X-axis and the Y-axis, and circle 204 of FIG. 8 has the largest coordinates in the X-axis and the Y-axis. At this time, the three circles 202, 203 and 204 may be formed in the direction of the Z-axis (i.e., can be formed with respect to the Z-axis), whereby each of the coordinates in the X-axis and the Y-axis has one positive value and one negative value. Thus, plotting circles in an X-Y plane having an area or diameter corresponding to the observed or measured contrast differences as a function of focus depth (the Z coordinate) provides a three-dimensional graph showing the curvature of the micro-lens, using essentially in-line monitoring equipment, and obtained without destroying or rejecting the substrates (e.g., wafers) from which the samples were taken.

Figure 1:
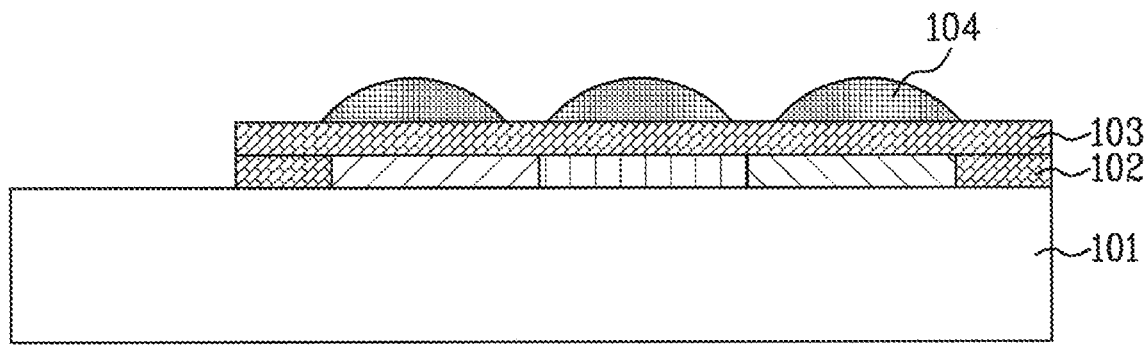
FIG. 1 is a cross sectional view of a conventional CMOS image sensor.
Figure 2:
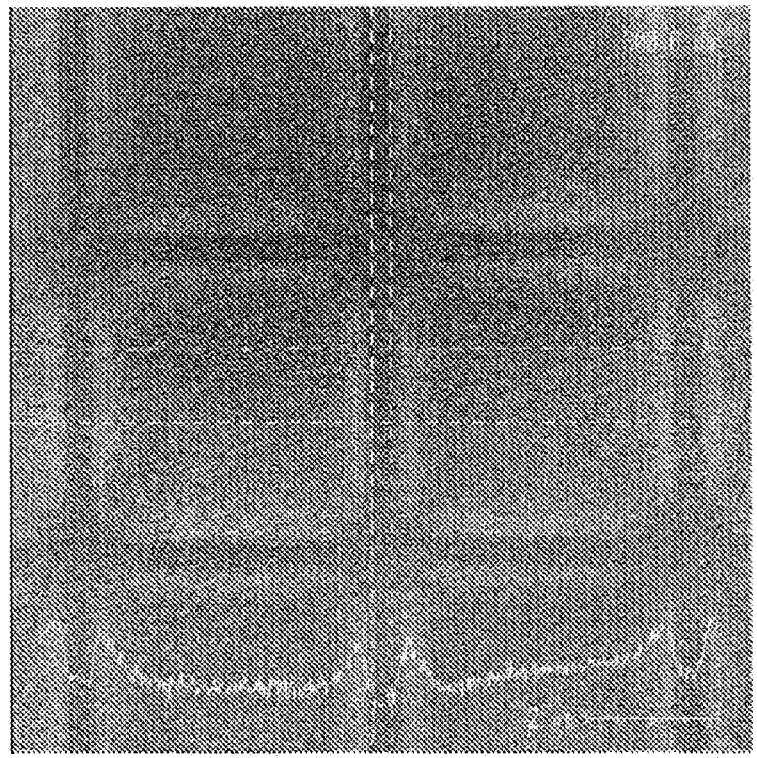
FIG. 2 illustrates a conventional process for measuring a space between micro-lenses using CD-SEM.
Figure 3:
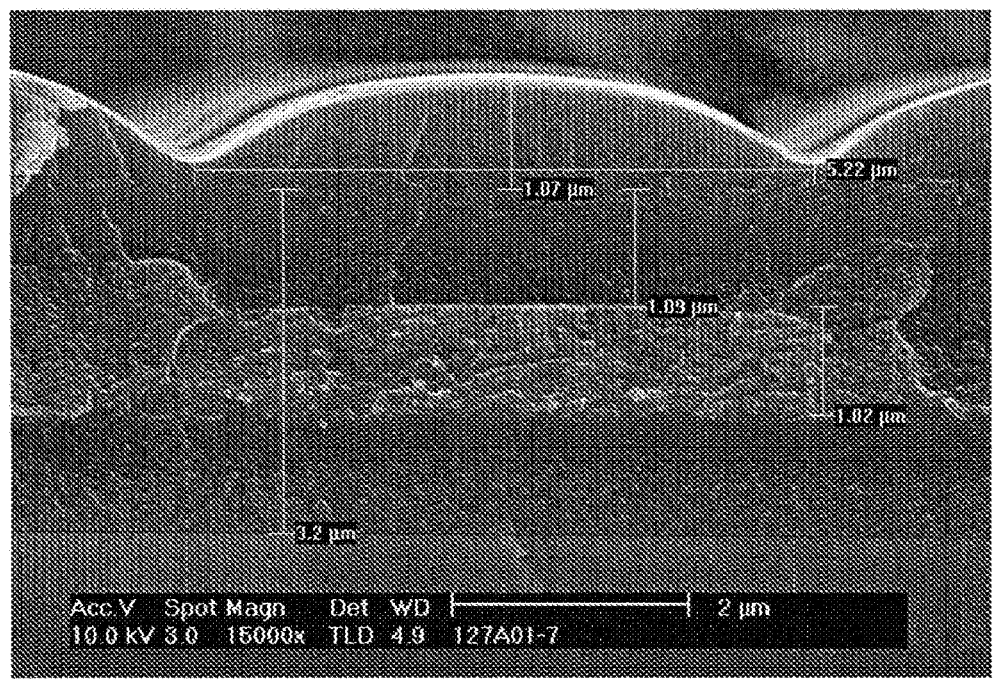
FIG. 3 illustrates a conventional process for monitoring a curvature of a micro-lens by rejecting produced substrates.
Figure 12:
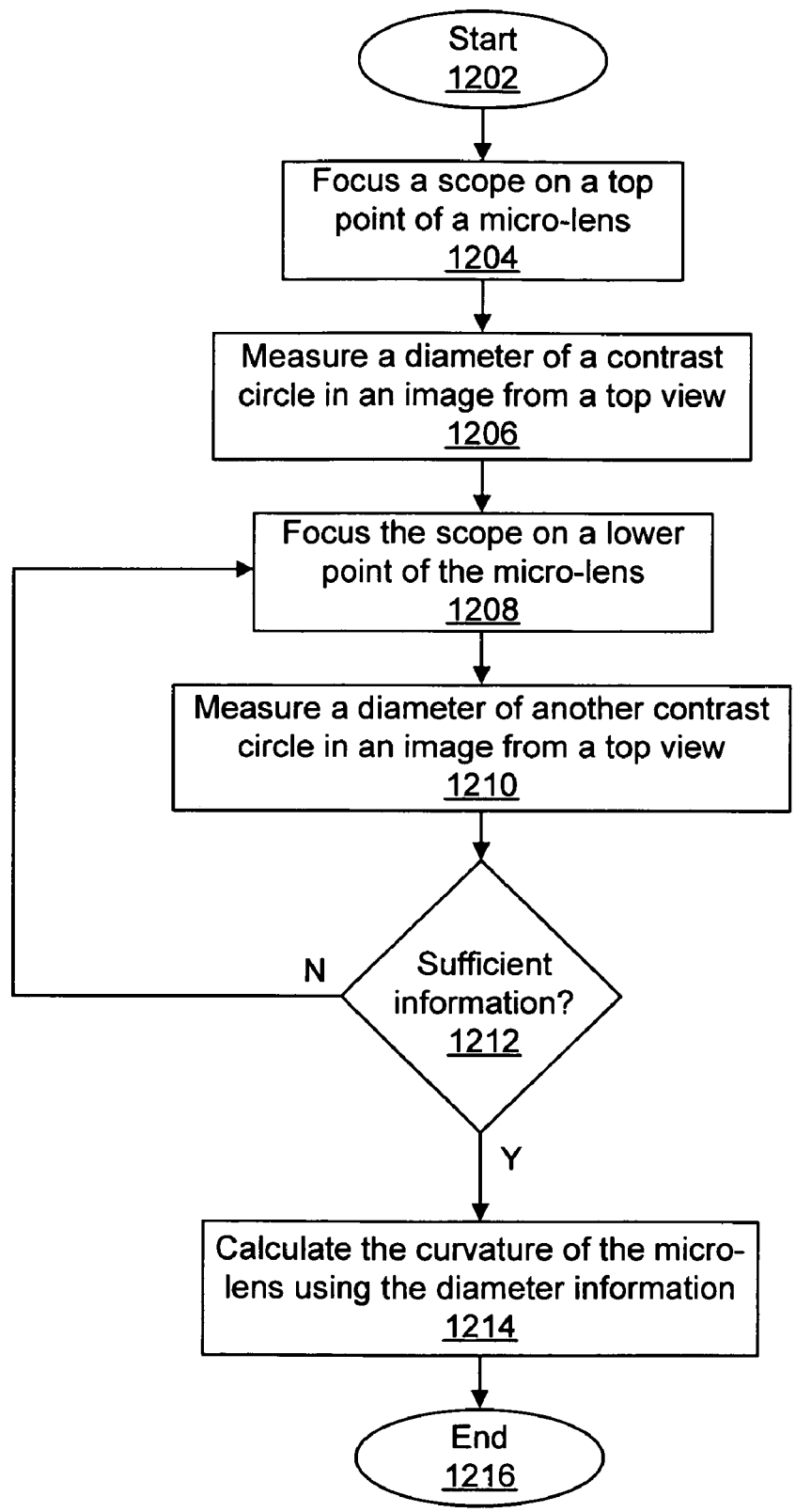
FIG. 12 illustrates a flow diagram of an exemplary method in accordance with embodiments of the present invention.

Referring now to FIG. 12, an illustration of a flow diagram of an exemplary method in accordance with embodiments of the present invention is shown. The flow can begin (1202), and the scope may be focused substantially on a top point of a micro-lens (1204). As discussed above, a contrast circle can be seen from a top view, and a diameter of the contrast circle can be measured (1206). Next, the scope can be focused on a lower point (i.e., a point lower than the previous focus point) of the micro-lens (1208). A diameter of another contrast circle resulting from this focus point can also be measured from a top view (1210). In some applications, these two diameter measurements may provide sufficient information (1212) for calculating the curvature of the micro-lens. If there is insufficient information (1212) for the particular application, the scope can be focused on another lower point of the micro-lens (1208) for another diameter measurement (1210). Depending on the particular application and/or the level of accuracy required, any number of such measurements may be taken (although at least two such measurements are generally needed to determine a microlens curvature). For example, the area and/or diameter of the micro-lens at the base (i.e., the interface between micro-lens 104 and the underlying layer, such as planarization layer 103, as shown in FIG. 1) is known or can be non-destructively determined (e.g., by CD-SEM, as discussed above). The base diameter, along with contrast circle information from at least two focal points, may provide sufficient information to determine and/or monitor the micro-lens curvature. Thus, the flow can loop through boxes 1208 and 1210 until sufficient information (1212) is obtained. Once there is sufficient information, the curvature of the micro-lens can be calculated using the diameter information (1214) and the flow can complete (1216).

Figure 13:
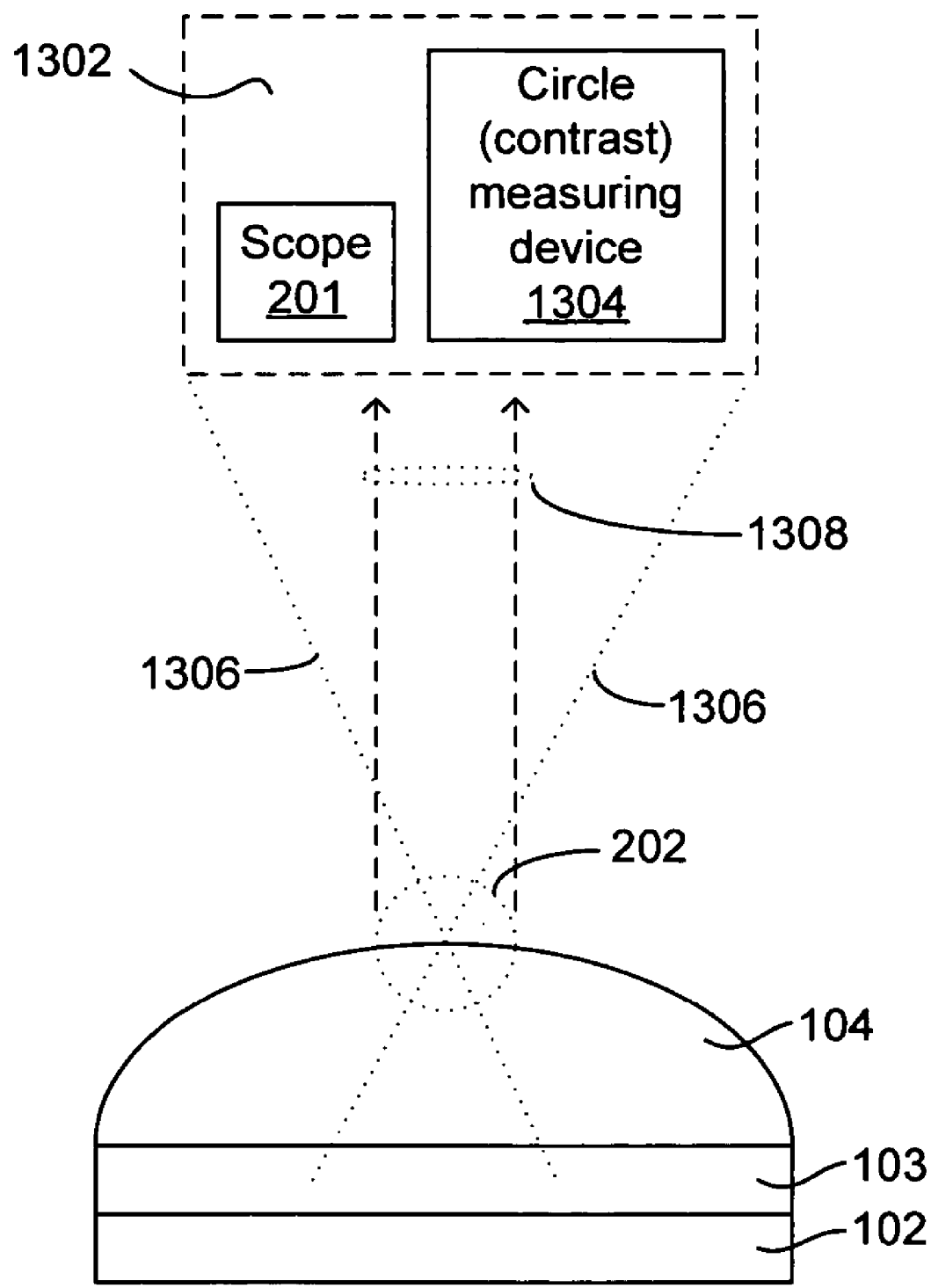
FIG. 13 illustrates an exemplary scope and contrast measuring system configured for use in accordance with embodiments of the present invention.

Referring now to FIG. 13, an illustration of an exemplary scope and contrast measuring system configured for use in accordance with embodiments of the present invention is shown. Scope and measuring equipment 1302 can be mounted or otherwise secured at a suitable position above the structure of micro-lens 104 (and planarization layer 103 and color filter array 102), for example. Scope and measuring equipment 1302 can provide focused light 1306 from scope 201 onto micro-lens 104, as discussed above. Contrast circle 202 (see, e.g., FIG. 4 and FIG. 5 above) can then be seen by scope and measuring equipment 1302. Circle (e.g., contrast circle) measuring device 1304 (which may comprise a camera and/or contrast detector) can then measure the diameter of the contrasted reflected light 1308, using conventional laser-based measurement techniques, for example. A computer or other calculating device (not shown) can then calculate the curvature of the micro-lens (e.g., at least in part by plotting a three-dimensional graph as shown and exemplified in FIG. 11) from the measurements obtained by scope 1302.

According to embodiments of the present invention, the diameter of the circle, from the top view of the micro-lens, may be measured corresponding to a change in a focus on an optic scope. Further, the size of the circle can be calculated with the change of the focus (change degree or movement of the focal point of the scope along the Z-axis), thereby calculating the curvature of the associated micro-lens. According to embodiments, the curvature of a micro-lens in-line can be monitored. As a result, a relatively constant curvature of each micro-lens can be maintained, thereby obtaining increased reliability in the associated image sensor chip.

In the exemplary method discussed above, the focus of the scope may be changed three times. However, one skilled in the art will recognize that if each circle is measured by changing the focus more than three times, a more precise curvature of the micro-lens may be calculated.

As discussed above, a method for monitoring the curvature of the micro-lens in-line according to embodiments of the present invention has a number of advantages, such as enabling monitoring and/or measuring the shape and/or curvature of the micro-lens without cutting the substrate and while in-line (e.g., during manufacturing in a production fabrication line), thereby improving image sensor reliability without adversely affecting yield and without substantially adversely affecting manufacturing throughput rates. Further, because measurement of the curvature of the produced substrate (e.g., supporting an image sensor chip) can be made without rejecting or destroying the substrate, the overall manufacturing yield and/or productivity may also be improved.

It will be apparent to those skilled in the art that various modifications and variations can be made in accordance with embodiments of the present invention without departing from the spirit or scope of the invention. Thus, it is intended that the present invention covers modifications and variations of the exemplary embodiments provided herein consistent with the scope of the appended claims and their equivalents.

What is claimed is:

1. A method for in-line monitoring a curvature of a micro-lens of a CMOS image sensor, comprising:
   measuring a first diameter or area of a first circle in the micro-lens by focusing a scope substantially on a top point of the micro-lens on the CMOS image sensor;
   measuring a second diameter or area of a second circle in the micro-lens by focusing the scope on a point lower than the top point of the micro-lens;
   using in-line monitoring equipment, plotting a graph depicting the first and second diameters or areas of the measured circles as a function of a depth of focus of the scope; and
   calculating the curvature of the micro-lens using the plotted graph.

2. The method of claim 1, wherein focusing the scope on the lower point comprises changing a depth of focus of the scope.

3. The method of claim 1, wherein the changed depth of focus is within a thickness range of the micro-lens.

4. The method of claim 1, wherein the first and second circles are seen from a top view.

5. The method of claim 1, wherein the first and second circles each have a difference of contrast from a larger circle corresponding to a diameter of the micro-lens.

6. The method of claim 1, further comprising the step of measuring a third diameter or area of a third circle in the micro-lens by focusing a scope on a third point of the micro-lens other than the top point and the lower point, and plotting the graph further depicts the third diameter or area.

7. The method of claim 1, comprising:
   measuring the first diameter of the first circle;
   measuring the second diameter of the second circle; and
   plotting the graph using the first and second diameters of the measured circles.

8. The method of claim 7, further comprising the step of measuring a third diameter of a third circle in the micro-lens by focusing a scope on a third point of the micro-lens other than the top point and the lower point, and plotting the graph further uses the third diameter.

9. The method of claim 1, wherein the graph comprises a three-dimensional graph.

10. A computer-readable medium containing a set of instructions adapted to perform the method of claim 1.

11. The medium of claim 10, further comprising one or more instructions adapted to measure a third diameter or area of a third circle in the micro-lens by focusing a scope on third point other than the top point and the lower point.

12. The medium of claim 11, further comprising one or more instructions adapted to calculate the curvature of the micro-lens further using the third diameter or area.

13. The method of claim 1, further comprising, after calculating the curvature of the micro-lens, repeating the method on another microlens.

14. A system configured for calculating a curvature of a micro-lens of a CMOS image sensor, comprising:
   a scope configured to focus light at a plurality of depths into the micro-Jens on the CMOS image sensor;
   a contrast measuring device configured to measure or determine a diameter or area of a plurality of circles corresponding to the plurality of depths of the focused light;
   equipment for plotting a graph depicting the first and second diameters or areas of the measured circles as a function of a depth of focus of the scope; and
   a calculating device configured to calculate the curvature of the micro-lens using the plotted graph.

15. The system of claim 14, wherein the plurality of depths includes a top point of the micro-lens and another point lower than the top point.

16. The system of claim 15, wherein the plurality of depths includes a third point of the micro-lens other than the top point and the lower point.

17. The system of claim 14, wherein the plurality of circles comprise a plurality of contrast circles.

18. The system of claim 14, wherein the contrast measuring device includes a laser.

19. The system of claim 14, configured for use in an a CMOS image sensor production flow.

* * * * *